(12) United States Patent
Shpak

(10) Patent No.: US 11,550,024 B2
(45) Date of Patent: Jan. 10, 2023

(54) INTEROMETRIC LOCATION SENSING

(71) Applicant: Deeyook Location Technologies Ltd., Tel Aviv (IL)

(72) Inventor: Eran Shpak, Tel Aviv (IL)

(73) Assignee: DEEYOOK LOCATION TECHNOLOGIES LTD., Tel Aviv (IL)

( * ) Notice: Subject to any disclaimer, the term of this patent is extended or adjusted under 35 U.S.C. 154(b) by 540 days.

(21) Appl. No.: 16/731,106

(22) Filed: Dec. 31, 2019

(65) Prior Publication Data

US 2020/0150216 A1 May 14, 2020

Related U.S. Application Data

(63) Continuation-in-part of application No. 16/332,362, filed as application No. PCT/IB2017/055514 on Sep. 13, 2017, now Pat. No. 11,215,688, which is a continuation-in-part of application No. 15/270,010, filed on Sep. 20, 2016, now Pat. No. 10,182,315, and a continuation-in-part of application No. 15/385,965, filed on Dec. 21, 2016, now Pat. No. 9,814,051.

(51) Int. Cl.
*G01S 5/10* (2006.01)
*G01S 5/02* (2010.01)
*H04W 88/02* (2009.01)

(52) U.S. Cl.
CPC .............. *G01S 5/10* (2013.01); *G01S 5/0236* (2013.01); *H04W 88/02* (2013.01)

(58) Field of Classification Search
CPC ......................................................... G01S 3/46
See application file for complete search history.

(56) References Cited

U.S. PATENT DOCUMENTS

| | | | | |
|---|---|---|---|---|
| 4,728,959 A | * | 3/1988 | Maloney ................... | G01S 3/48 342/465 |
| 5,227,803 A | * | 7/1993 | O'Connor ................. | G01S 5/04 342/51 |
| 5,327,144 A | | 7/1994 | Stilp et al. | |
| 5,477,230 A | * | 12/1995 | Tsui ........................... | G01S 3/46 342/442 |

(Continued)

FOREIGN PATENT DOCUMENTS

| | | |
|---|---|---|
| CN | 104581942 A | 4/2015 |
| CN | 107806858 A | 3/2018 |

(Continued)

OTHER PUBLICATIONS

JP Application # 2019-536344 Office Action dated Aug. 31, 2021.
(Continued)

*Primary Examiner* — Bernarr E Gregory
(74) *Attorney, Agent, or Firm* — Kligler & Associates Patent Attorneys Ltd

(57) ABSTRACT

A method for location finding includes detecting a respective phase difference between the received radio signals that are associated with each of the multiple antennas of each of the fixed transceivers. One or more respective angles are computed between each of the fixed transceivers and the mobile transceiver based on the respective phase differences. Location coordinates of the mobile transceiver are found based on the angles and the transmit locations of the transmitters.

31 Claims, 6 Drawing Sheets

(56) References Cited

U.S. PATENT DOCUMENTS

| | | | |
|---|---|---|---|
| 5,724,047 A * | 3/1998 | Lioio | G01S 3/48 342/417 |
| 6,459,903 B1 * | 10/2002 | Lee | G01S 5/12 455/456.1 |
| 7,110,793 B1 | 9/2006 | Ishida | |
| 7,248,841 B2 | 7/2007 | Agee et al. | |
| 7,502,688 B2 | 3/2009 | Hirokawa | |
| 8,326,324 B2 * | 12/2012 | Wu | G01S 5/04 342/450 |
| 8,581,781 B2 | 11/2013 | Slastion | |
| 8,797,213 B2 | 8/2014 | Pun et al. | |
| 8,855,671 B1 | 10/2014 | Mirov | |
| 9,338,665 B2 | 5/2016 | Zhang et al. | |
| 9,354,297 B2 | 5/2016 | Ling et al. | |
| 9,733,337 B2 | 8/2017 | Edge et al. | |
| 9,804,256 B2 | 10/2017 | Jamieson et al. | |
| 9,814,051 B1 * | 11/2017 | Shpak | G01S 5/10 |
| 9,924,503 B2 | 3/2018 | Kim et al. | |
| 10,182,315 B2 * | 1/2019 | Shpak | G01S 3/46 |
| 10,206,122 B2 | 2/2019 | Wang et al. | |
| 11,215,688 B2 * | 1/2022 | Shpak | G01S 5/08 |
| 2003/0129996 A1 | 7/2003 | Maloney et al. | |
| 2008/0039030 A1 | 2/2008 | Khan et al. | |
| 2008/0161016 A1 | 7/2008 | Hochwald et al. | |
| 2008/0316105 A1 * | 12/2008 | Seong | G01S 5/12 342/442 |
| 2009/0243932 A1 | 10/2009 | Moshfeghi | |
| 2010/0238862 A1 * | 9/2010 | Davidson | G01S 5/14 370/328 |
| 2010/0309999 A1 | 12/2010 | Yang et al. | |
| 2011/0018766 A1 | 1/2011 | Steer et al. | |
| 2012/0281551 A1 | 11/2012 | Alanara | |
| 2013/0045759 A1 | 2/2013 | Smith | |
| 2013/0195002 A1 | 8/2013 | Walker et al. | |
| 2013/0271323 A1 * | 10/2013 | Joo | G01S 3/48 342/442 |
| 2014/0218240 A1 | 8/2014 | Kpodzo et al. | |
| 2015/0296479 A1 | 10/2015 | Chao et al. | |
| 2016/0033614 A1 | 2/2016 | Wang et al. | |
| 2017/0187557 A1 | 6/2017 | Zhang et al. | |
| 2017/0191836 A1 | 7/2017 | Korneluk et al. | |
| 2018/0149729 A1 | 5/2018 | Grandin et al. | |
| 2018/0364735 A1 | 12/2018 | Holmström et al. | |

FOREIGN PATENT DOCUMENTS

| | | |
|---|---|---|
| CN | 108028797 A | 5/2018 |
| WO | 2010105345 A1 | 9/2010 |
| WO | 2013144760 A1 | 10/2013 |
| WO | 2013154334 A1 | 10/2013 |
| WO | 2014046689 A1 | 3/2014 |
| WO | 2014131074 A1 | 9/2014 |
| WO | 2015069963 A1 | 5/2015 |
| WO | 20161245898 A1 | 8/2016 |
| WO | 2017062902 A1 | 4/2017 |

OTHER PUBLICATIONS

European Application #17852492.2 search report dated Mar. 31, 2020.
International Application # PCT/IB2020/057436 Search Report dated Oct. 26, 2020.
Kotaru et al., "SpotFi: Decimeter Level Localization Using WiFi", SIGCOMM '15, London, UK, pp. 269-282, Aug. 17-21, 2015.
IN Application # 201947015680 Office Action dated Jun. 1, 2021.

* cited by examiner

INTERFEROMETRIC LOCATION SENSING

CROSS-REFERENCE TO RELATED APPLICATION

This application is a continuation in part of U.S. patent application Ser. No. 16/332,362, filed Mar. 12, 2019, now U.S. Pat. No. 11,215,688, which was filed in the national phase of PCT Patent Application PCT/IB2017/055514, filed Sep. 13, 2017, claiming priority from U.S. patent application Ser. No. 15/270,010, filed Sep. 2016 (now U.S. Pat. No. 10,182,315), and U.S. patent application Ser. No. 15/385,965, filed Dec. 21, 2016 (now U.S. Pat. No. 9,814,051). All of these related applications are incorporated herein by reference.

FIELD OF THE INVENTION

The present invention relates generally to wireless communication systems, and particularly to methods for localization based on wireless network signals.

BACKGROUND

Various techniques are known in the art for finding the location of a mobile wireless transceiver, such as a cellular telephone. For example, nearly all cellular telephones now have a Global Positioning System (GPS) receiver, which derives location coordinates from signals received from geostationary satellites. Because of its dependence on weak satellite signals, however, GPS works poorly, if at all, indoors and in crowded urban environments. Cellular networks are also capable of triangulating telephone location based on signals received or transmitted between the cellular telephone and multiple cellular antennas, but this technique is inaccurate and unreliable.

A number of methods have been proposed for indoor localization based on an existing wireless local area network (WLAN) infrastructure. One such approach is described, for example, by Kotaru et al., in "SpotFi: Decimeter Level Localization using WiFi," published in SIGCOMM '15 (London, UK, Aug. 17-21, 2015). According to the authors, SpotFi computes the angle of arrival (AoA) of multipath components received from access points, and uses filtering and estimation techniques to identify the AoA of a direct path between the localization target and the access point.

As another example, U.S. Patent Application Publication 2009/0243932 describes a method for determining the location of a mobile device. The method comprises transmitting a signal between a plurality of known locations and receiving the signal at a device of unknown location, such as a mobile device. The signal may include multiple tones having different frequencies and resulting in sets of residual phase differences. The location of the mobile device may be determined using the known locations and the frequency and phase differences between the transmitted tones. In one embodiment, orthogonal frequency domain multiplexing (OFDM) signals may be used between an access point and mobile device to determine the location of the mobile device.

As a further example, U.S. Patent Application Publication 2016/0033614 describes a method of direction finding (DF) positioning involving main lobe and grating lobe identification in a wireless communication network. A receiver performs the DF algorithm on radio signals associated with multiple antennas over a first channel frequency and estimates a first set of DF solutions. The receiver performs the DF algorithm on radio signals associated with multiple antennas over a second channel frequency and estimates a second set of DF solutions. The receiver then identifies the correct DF solution (e.g., the main lobe direction) by comparing the first set of DF solutions and the second set of DF solutions.

SUMMARY

Embodiments of the present invention that are described hereinbelow provide improved methods and systems for location finding.

There is therefore provided, in accordance with an embodiment of the invention, a method for location finding, which includes detecting a respective phase difference between the received radio signals that are associated with each of the multiple antennas of each of the fixed transceivers. One or more respective angles are computed between each of the fixed transceivers and the mobile transceiver based on the respective phase differences. Location coordinates of the mobile transceiver are found based on the angles and the transmit locations of the transmitters.

In one embodiment, receiving the radio signals includes receiving, by the mobile transceiver, the radio signals transmitted from the plurality of the fixed transceivers, and computing the one or more respective angles includes computing angles of departure of the radio signals from the fixed transceivers to the mobile transceiver. Alternatively or additionally, receiving the radio signals includes receiving, by the fixed transceivers, the radio signals transmitted from the mobile transceiver, and computing the one or more respective angles includes computing angles of arrival of the radio signals from the fixed transceivers to the mobile transceiver.

In some embodiments, the fixed transceivers are disposed in proximity to a common plane, and finding the location coordinates includes computing the location coordinates of the mobile transceiver in the common plane. In an example embodiment, the common plane is a floor in a man-made structure.

In some embodiments, computing the one or more respective angles includes defining multiple loci in the common plane corresponding respectively to the angles between each of the plurality of the fixed transceivers and the mobile receiver, and finding the location coordinates includes identifying an intersection of the loci as the second location of the mobile transceiver. Typically, the multiple loci include at least two rays extending through the plane from at least one of the first locations. In a disclosed embodiment, the multiple antennas of each of the fixed transceivers are separated by an inter-antenna distance, and defining the multiple loci includes computing an angular separation between the at least two rays as a function of a ratio between the inter-antenna distance and a wavelength of the radio signals. Defining the multiple loci may include, when the ratio between the inter-antenna distance and a wavelength of the radio signals for a given fixed transceiver is greater than one, defining at least two of the rays emanating from the given fixed transceiver such that the angular separation between the at least two of the rays is less than 180°.

In some embodiments, the radio signals transmitted over the air between a given fixed transceiver and the mobile transceiver include at least first and second radio signals, which are associated respectively with first and second ones of the multiple antennas and are both modulated with a given sequence of symbols, and detecting the respective phase difference includes identifying a given symbol in the sequence in each of the first and second radio signals that are received over the air, and measuring a delay in arrival of the given symbol between the first and second radio signals. In a disclosed embodiment, the first and second radio signals encode identical data using a multi-carrier encoding scheme with a predefined cyclic delay between the first and second radio signals, and measuring the delay includes applying the cyclic delay in detecting the respective phase difference. Additionally or alternatively, the given sequence of the symbols includes a predefined training sequence, and identifying the given symbol includes finding a specified one of the symbols in the training sequence.

In another embodiment, detecting the respective phase difference includes estimating channel state information between each of the multiple antennas and the mobile transceiver based on the received radio signals, and computing the one or more respective angles includes deriving the angles from the channel state information.

In a disclosed embodiment, the fixed transceivers include at least one wireless access point, and receiving the radio signals include receiving and processing the radio signals received by the mobile transceiver from the at least one wireless access point without establishing an association between the mobile transceiver and the at least one wireless access point.

In some embodiments, the method includes storing a map of the first locations of the fixed transceivers, and finding the location coordinates includes referring the computed angles to the map in order to find the location coordinates relative to the map. In one such embodiment, the map is stored on a server, and referring the computed angles of departure to the map includes transmitting information to the server with respect to the received radio signals, and computing the location coordinates at the server using the transmitted information.

There is also provided, in accordance with an embodiment of the invention, apparatus for location finding, which includes a mobile transceiver including at least one receive antenna, which is configured to receive at a given second location, radio signals transmitted from a plurality of fixed transceivers, each having multiple antennas, at different, respective first locations. A processor is configured to process the received radio signals so as to detect a respective phase difference between the radio signals received from the multiple antennas of each of the fixed transceivers, to compute one or more respective angles of departure from each the fixed transceivers to the mobile transceiver based on the respective phase differences, and to find location coordinates of the mobile transceiver based on the angles of departure and the first locations of the fixed transceivers.

There is additionally provided, in accordance with an embodiment of the invention, a system for location finding, including a plurality of fixed transceivers, each having multiple antennas, at different, respective first locations, wherein the fixed transceivers are configured to receive via the multiple antennas radio signals transmitted from a mobile transmitter at a given second location. A processor is configured to process the received radio signals so as to detect a respective phase difference between the radio signals received by the multiple antennas of each of the fixed transceivers, to compute one or more respective angles of arrival from the mobile transceiver to each of the fixed transceivers based on the respective phase differences, and to find location coordinates of the mobile transceiver based on the angles of arrival and the first locations of the fixed transceivers.

There is further provided, in accordance with an embodiment of the invention, a computer software product for use in conjunction with radio signals transmitted and received between a plurality of fixed transceivers having multiple antennas at different, respective first locations and a mobile transceiver at a second location, the product including a tangible, non-transitory computer-readable medium in which program instructions are stored, which instructions, when read by a processor, cause the processor to receive from at least one of the transceivers a respective phase difference detected by the at least one of the transceivers between the received radio signals that are associated with each of the multiple antennas of each of the fixed transceivers. The instructions cause the processor to compute one or more respective angles between each the fixed transceivers and the mobile transceiver based on the respective phase differences, and to find location coordinates of the mobile transceiver based on the angles and the first locations of the fixed transceivers.

The present invention will be more fully understood from the following detailed description of the embodiments thereof, taken together with the drawings in which:

DETAILED DESCRIPTION OF EMBODIMENTS

Figure 1:
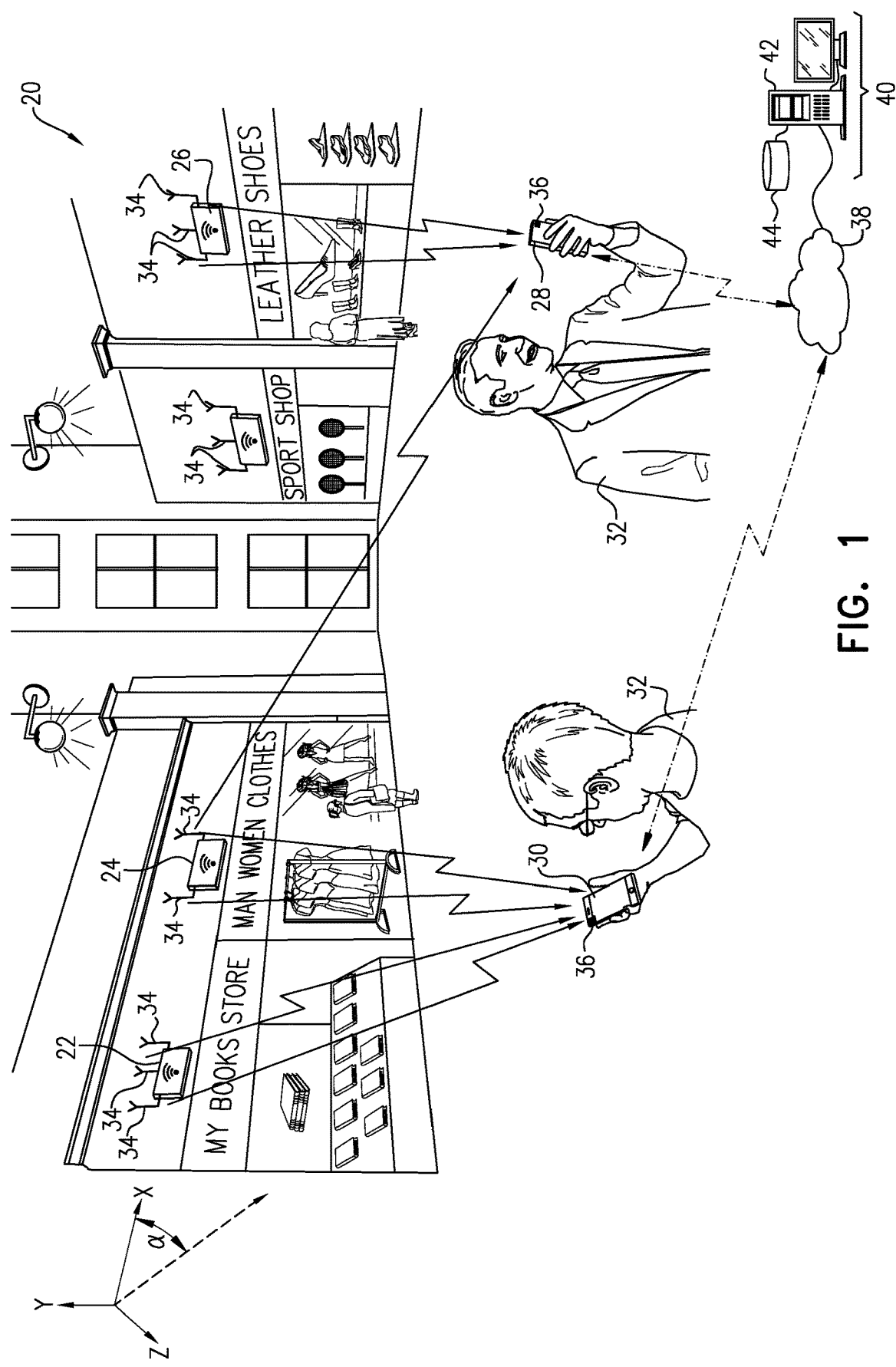
FIG. 1 is schematic, pictorial illustration of a system for wireless location finding, in accordance with an embodiment of the invention.

Urban environments are typically covered by a dense infrastructure of fixed transceivers for wireless communications, such as Wi-Fi® access points and cellular microcell and picocell base station transceivers. Such transceivers are deployed by wireless service providers in order to support communications with subscriber devices. Embodiments of the present invention, however, put this infrastructure to a different novel use, in finding location coordinates of wireless transceivers. These location coordinates may be used, for example, in navigation applications (particularly indoor navigation), as well as in tracking the locations of people and other assets.

The embodiments of the present invention that are described hereinbelow take advantage of the fact that modern communication access points and other fixed transceivers commonly have an array of antennas, spaced apart by a certain distance, through which they transmit multiple instances of the same radio signals. When a mobile transceiver receives these signals at a given location, the signals will be offset in phase as a result, inter alia, of the small difference in the distance from each of the antennas in the array to the mobile transceiver. In similar fashion, when the fixed transceiver receives signals transmitted by the mobile transceiver, the signals received at the antennas in the array will be offset in phase.

This difference in distance—and hence the difference in phase between the received radio signals that are associated with (i.e., transmitted or received by) each of the multiple antennas in the array—varies as a function of the angle between the fixed transceiver and the mobile transceiver. In some embodiments, the mobile transceivers detects the angle of departure of the signals transmitted from the fixed transceivers to the mobile transceiver. In other embodiments, the fixed transceivers detect the angle of arrival of the signals that they receive from the mobile transceiver. In either case, by detecting and processing the phase differences at the receiver, it is possible to estimate the angular location of the mobile transceiver relative to the fixed transceivers.

Although establishing a two-way communication link between a mobile transceiver and a fixed transceiver, such as an access point, usually requires a process of bilateral association and authentication, the transceivers in embodiments of the present invention are able to detect and process the radio signals and find the angle between the transceivers without establishing any sort of association.

Based on the above principles, some embodiments of the present invention provide a method for location finding in which a receiver receives radio signals transmitted between multiple fixed transceivers, each having multiple antennas, at different, respective locations and a mobile transceiver at another location. The receiver detects the phase difference between the radio signals associated with each of the multiple antennas (i.e., transmitted by or received by each of the antennas) of each of the transmitters. Based on these phase differences, the receiver computes one or more angles, for example angles of departure or angles of arrival) between each the transmitters and the receiver. (As will be explained below, a given phase difference may typically correspond to two or more different angles.) The location coordinates of the receiver are then computed based on the angles and the locations of the fixed transceivers.

Some of the embodiments that are described hereinbelow assume that the fixed transceivers are disposed in proximity to a common plane, for example in proximity to the floor of a man-made structure. The term "proximity" is used in this context, in the present description and the claims, to mean that the distance of each of the fixed transceivers from the plane is no more than 10% of the average distance between the fixed transceivers and the mobile transceiver. The location coordinates of the mobile transceiver are computed in this common plane. This planar assumption applies in many urban environments, and constraining the fixed and mobile transceivers to a common plane simplifies the computation of the location coordinates. In alternative embodiments, however, this assumption is relaxed, and three-dimensional (3D) angular coordinates are used in finding the location of the receiver.

In some embodiments of the present invention, the location coordinates of the mobile transceiver are found by defining multiple loci in the common plane corresponding to possible angles between each fixed transceiver to the mobile transceiver. The loci are defined by the measured phase differences as explained above, and the intersection of these loci gives the receive location of the mobile transceiver. The signals from a sufficient number of the fixed transceivers are detected and processed in order to resolve any ambiguity in the location coordinates that are derived in this manner.

The embodiments described above find the location coordinates of the mobile transceiver relative to a frame of reference of the fixed transceivers (for example, wireless access points) that exchange the signals with the mobile transceiver. In some embodiments, a server stores a map of the transmit locations of the fixed transceivers, and the computed angles are referred to the map in order to find the location coordinates of the mobile transceiver relative to the map. The server may construct the map by receiving reports, from receivers at different locations, of respective estimated angles of departure of the radio signals received by mobile transceivers from the fixed transceivers, for example as described in the above-mentioned U.S. Pat. No. 9,814,051. The transmitted signals may also include respective identifiers (for example, by announcing the Basic Service Set Identifier—BSSID—of the access point transmitting a given signal). The receiver may report these identifiers together with the angles of departure, so that the identity of each fixed transceiver can be associated with its location in the map.

Once the locations of the fixed transceiver in a certain area have been mapped, the locations of mobile transceivers, such as mobile telephones, can be found accurately within the area based on the signals that they receive from the fixed transceivers (even without associating or otherwise communicating back with the network to which the transmitters belong, as explained above), or the signals that the fixed transceivers receive from the mobile transceivers. This sort of map of fixed transceivers can thus be used for accurate and convenient geo-location without dependence on GPS, for example in indoor and urban locations.

Some of the embodiments described hereinbelow relate, for the sake of concreteness and clarity, specifically to wireless access points operating in accordance with the IEEE 802.11 family of standards. The principles of the present invention may similarly be applied, however, mutatis mutandis, to other sorts of multi-antenna transmitters. For example, in an alternative embodiment of the present invention, measure angles of departure or arrival can be measured with respect to multi-antenna cellular base stations that transmit and receive signals using multi-carrier encoding schemes in accordance with the applicable standards. All such alternative implementations of the present principles are considered to be within the scope of the present invention.

The embodiments that are described hereinbelow are based mainly on detection of the angle of departure of radio signals received by a mobile transceiver from multiple fixed transceivers. Various techniques may be used for this purpose, including (without limitation) those described in the above-mentioned U.S. Pat. No. 9,814,051, as well as techniques based on estimation of channel state formation, as described hereinbelow. The principles of these embodiments may also be, mutatis mitandis, in detecting the angle of arrival of radio signals received by fixed transceivers from a mobile transceiver. The angles in either case—whether angles of departure or angles of arrival—may be used in similar fashion to find the location coordinates of the mobile transceiver. Therefore, references to angles in the present description and in the claims should be understood as encompassing both angles of departure and angles of arrival, unless otherwise specified.

System Description

FIG. 1 is schematic, pictorial illustration of a system 20 for wireless communications and position finding, in accordance with an embodiment of the invention. By way of example, FIG. 1 shows a typical environment, such as a shopping mall or street, in which multiple access points 22, 24, 26, . . . , are deployed, often by different WLAN proprietors independently of one another. (The notation " . . . " is used in enumerating items of a given type in the present description to indicate that the pictured instances of the given type of item may be part of a larger group of such items.) Signals transmitted by the access points are received by receivers in the form of mobile stations 28, 30, . . . , which are operated by users 32 who are free to move around within the area covered by system 20. In the pictured embodiment, stations 28, 30, . . . , are shown as smartphones; but other sorts of mobile transceivers, such as laptop and tablets computers, as well as dedicated radio tags, may be used in similar fashion and can similarly find angles from departure of access points 22, 24, 26, . . . , as described hereinbelow. Alternatively or additionally, access points 22, 24, 26, . . . , can find angles of arrival of signals transmitted by mobile stations 28, 30, . . . .

Each of access points 22, 24, 26, . . . , in system 20 is assumed to have two or three antennas 34, as shown in FIG. 1. The principles of the present invention are similarly applicable to fixed transceivers having even greater numbers of antennas. Mobile stations 28, 30, . . . , are each assumed to have a single, omnidirectional antenna 36, although the techniques described herein for detecting angles can similarly be implemented by multi-antenna stations.

Mobile stations 28, 30, . . . , process signals received from antennas 34 in order to estimate the angles of departure of the signals from the respective access points 22, 24, 26, . . . , as well as to extract an identifier (such as the BSSID) with regard to each access point. The angles of departure in the coordinate frame of the access points (marked a in FIG. 1) may be computed in two dimensions, assuming the access points and mobile stations to be in proximity to a common plane, or in a three-dimensional coordinate system. The mobile stations are able to perform these functions, as described further hereinbelow, without necessarily associating with the access points.

On the other hand, mobile stations 28, 30, . . . , may associate with one or more of access points 22, 24, 26, . . . , for purposes of Internet communications. Alternatively or additionally, the mobile stations may access the Internet via a cellular network or other connection. In any case, mobile stations 28, 30, . . . , communicate the angle-of-departure data and access point identification that they collect via a network 38 to a mapping server 40. This information may be collected and reported autonomously and automatically by a suitable application program ("app") running in the background on the mobile stations. Alternatively or additionally, the access points may compute and communication angle-of-arrival data to server for the purpose of finding locations of the mobile stations.

Server 40 typically comprises a general-purpose computer, comprising a programmable processor 42 and a memory 44. The functions of server 40 that are described herein are typically implemented in software running on processor 42, which may be stored on tangible, non-transitory computer-readable media, such as optical, magnetic or electronic memory media.

In other embodiments, a location-tracking device based on the principles described herein is embedded into or attached to assets and is used by server 40 in automatically tracking the locations of these assets. Non-limiting examples of such assets include cellular telephones, robots, hospital beds, medical equipment, and inventory items. Accurate real-time indoor and outdoor location-tracking of this type is vital in many scenarios, such as ensuring the wellbeing of people in medical care; safely operating robots and drones in their working environments; tracking assets worldwide, for example for purposes of insurance coverage; improving the effectiveness of marketing campaigns to people in public spaces, for example shopping malls and sports stadia; and facilitating safe driving in urban environments and parking garages.

Interferometric Methods for Estimating Angle of Departure

Figure 2:
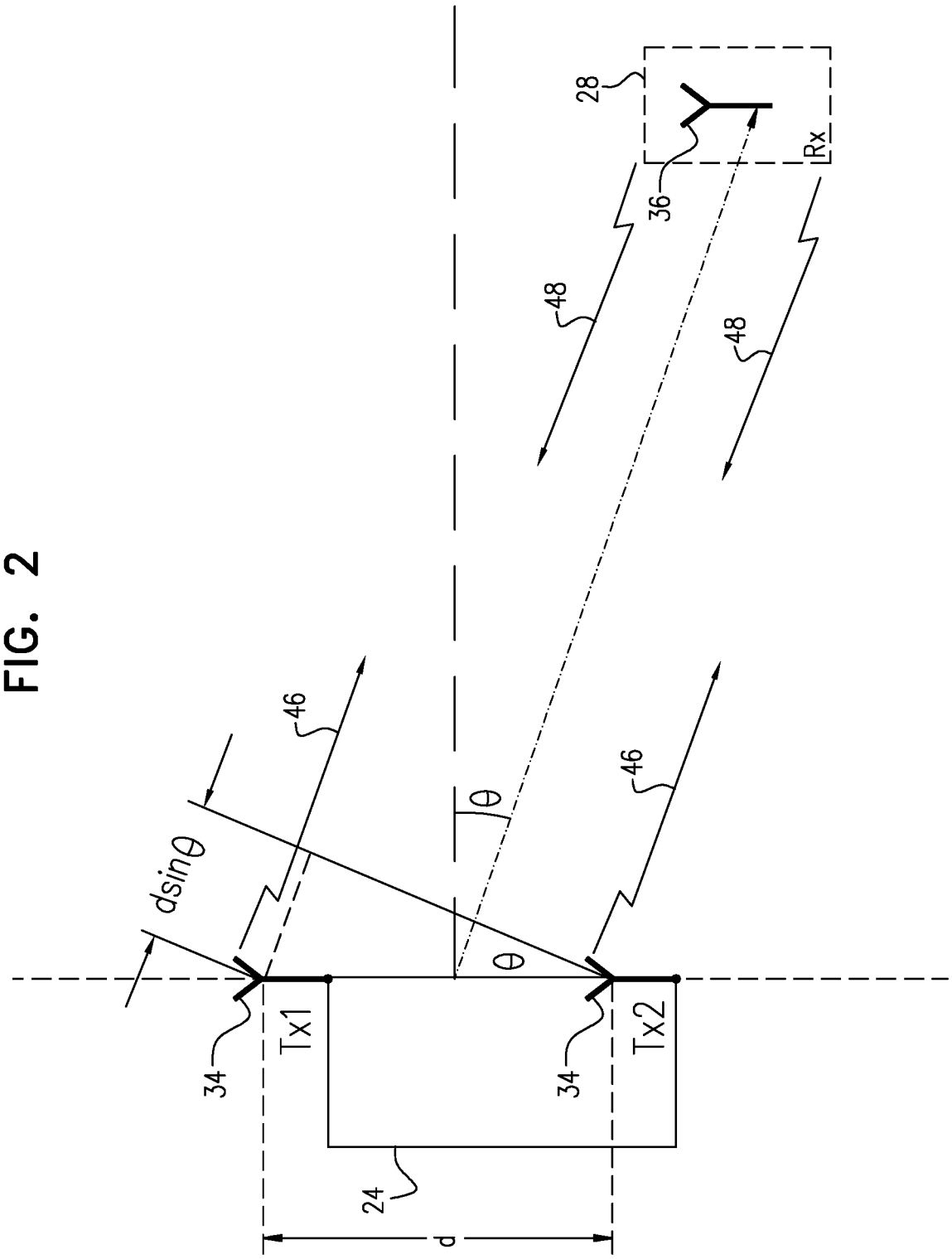
FIG. 2 is a diagram that schematically illustrates a coordinate frame used in deriving an angle of departure or arrival of wireless signals from a transmitter to a receiver, in accordance with an embodiment of the invention.

FIG. 2 is a diagram that schematically illustrates a coordinate frame used in deriving an angle of wireless signals transmitted between access point 24 and mobile station 28, in accordance with an embodiment of the invention. This particular pair of an access point and a mobile station is selected purely for convenience, and similar principles will apply to any given pair. Although access point 24 is shown as having two antennas 34 (labeled Tx1 and Tx2), the same geometrical principles apply to access points having three or more antennas arranged in a linear array. The description that follows relates specifically to the angle of departure of downlink signals 46 that are transmitted from antennas 34 of access point 24 to mobile station 28; but the principles of this and the subsequent embodiments may similarly be applied in finding the angle of arrival of uplink signals 48 from mobile station 28 that are received by antennas 34.

Antennas 34 define an array axis as the line passing through the bases of the antennas. The antennas are separated along the array axis by a known inter-antenna distance d. (The array axis is the line running through antennas 34—shown as a vertical dashed line in FIG. 2.) In wireless access points, for example, the distance d is designed to be a half wavelength, for example, $\lambda/2=6.25$ cm at the standard WLAN transmission frequency of 2.4 GHz, wherein $\lambda$ is the wavelength of the radio signals. Alternatively, transmitters in embodiments of the present invention may have larger or smaller values of d (and correspondingly, larger or smaller ratios between the inter-antenna distance and the wavelength). The angle of departure $\theta$ of the signals from antennas 34 to antenna 36 of mobile station 28 is taken relative to the normal to the array axis, as shown in FIG. 2. Assuming the distance from access point 24 to mobile station 28 to be considerably greater than d, there will be a difference of $d*\sin\theta$ in the path length from Tx1 to antenna 36 (referred to as Rx) relative to the path length from Tx2.

As an example, assuming the length of the path from Tx2 to Rx is 6.0000 m, $\theta=30°$, the slightly longer path from Tx1 to Rx will be 6.03125 m. This path difference translates into a 90° phase difference: $\Delta\varphi=d\sin(\pi/6)=\lambda/2*\frac{1}{2}=\frac{1}{4}$. The phase difference varies with angle, as well as with the wavelength (or frequency) of transmission.

In general terms, in embodiments of the present invention, a receiver such as mobile station 28 measures the carrier phase difference (CPD) between the radio signals received from the different antennas of each of a number of different transmitters at different locations. Various methods can be applied in measuring the CPD. For example, assuming the radio signals emitted from both of antennas 34 are both modulated with a given sequence of symbols, mobile station 28 can compute the CPD by identifying a given symbol in the sequence in each of the radio signals that it receives and measuring the delay in arrival of the given symbol between the radio signals. When the radio signals from both antennas encode identical data using a multi-carrier encoding scheme (such an OFDM scheme) with a predefined cyclic delay between the signals, the known cyclic delay can readily by applied in detecting the phase difference. Techniques of this sort for measuring CPD, and thus the angle of departure, are described in detail in the above-mentioned PCT Patent Application PCT/IB2017/055514.

As another example, the receiver may detect a predefined training sequence in the radio signals transmitted from antennas 34, and may measure the times at which a certain symbol in the training sequence reaches the receiver from each of the transmitters.

More specifically, modern wireless standards specify certain training fields that are to be transmitted in the preambles of data frames that are transmitted by wireless transceivers, such as access points, and define procedures by which a mobile station may estimate channel state information between each of antennas 34 and antenna 36 based on the training fields in the received radio signals. For example, the preambles of frames that are transmitted in accordance with the IEEE 802.11n standard (as well as later standards in the 802.11 family) include multiple instances of the high-throughput long training field (HTLTF), one for each antenna. The receiver processes these fields in order to compute a matrix of complex values of channel state information $\{CSI_{i,j}\}$, representing the amplitude and phase of the channel response for each antenna i in each frequency bin j. The difference between the phase components of the CSI for the different antennas in a chosen bin gives the CPD. For example, assuming access point 24 has two antennas 34 (so that i=0, 1):

$$CPD = \angle CSI_{0,j} - \angle CSI_{1,j}$$

As a further example, if the receiver itself has multiple antennas, it may apply phased detection in distinguishing the signals received from each of antennas 34 of the transmitter, and thus measure the CPD between the signals.

Regardless of the method by which the CPD is measured, it is related to the angle of departure θ (FIG. 2) by the following formula, which expresses an interferometry model:

$$CPD = \left(2\pi \frac{d}{\lambda} \sin\theta\right) \bmod 2\pi$$

The ranges of both the angle of departure and the CPD are [0,2π), but the functional relation is not one-to-one: At least two values of θ transform into the same CPD: If θ is a solution, so is π−θ. When $$\frac{2d}{\lambda} \leq 1,$$

there are exactly two possible solutions (θ,π−θ) mirroring each other along a line crossing the array axis. (Although FIG. 2 shows only a single solution, as a ray extending from access point 24 to mobile station 28, there is, in addition, a second solution mirrored by the line crossing the array axis.) When $$\frac{2d}{\lambda} > 1,$$

four or more solutions are possible (as the argument in the modulo exceeds 2π when the sine spans (−1,1]), defining rays emanating from the transmitter. The number of solutions is always even.

Location-Finding Using CPD

Figure 3A:
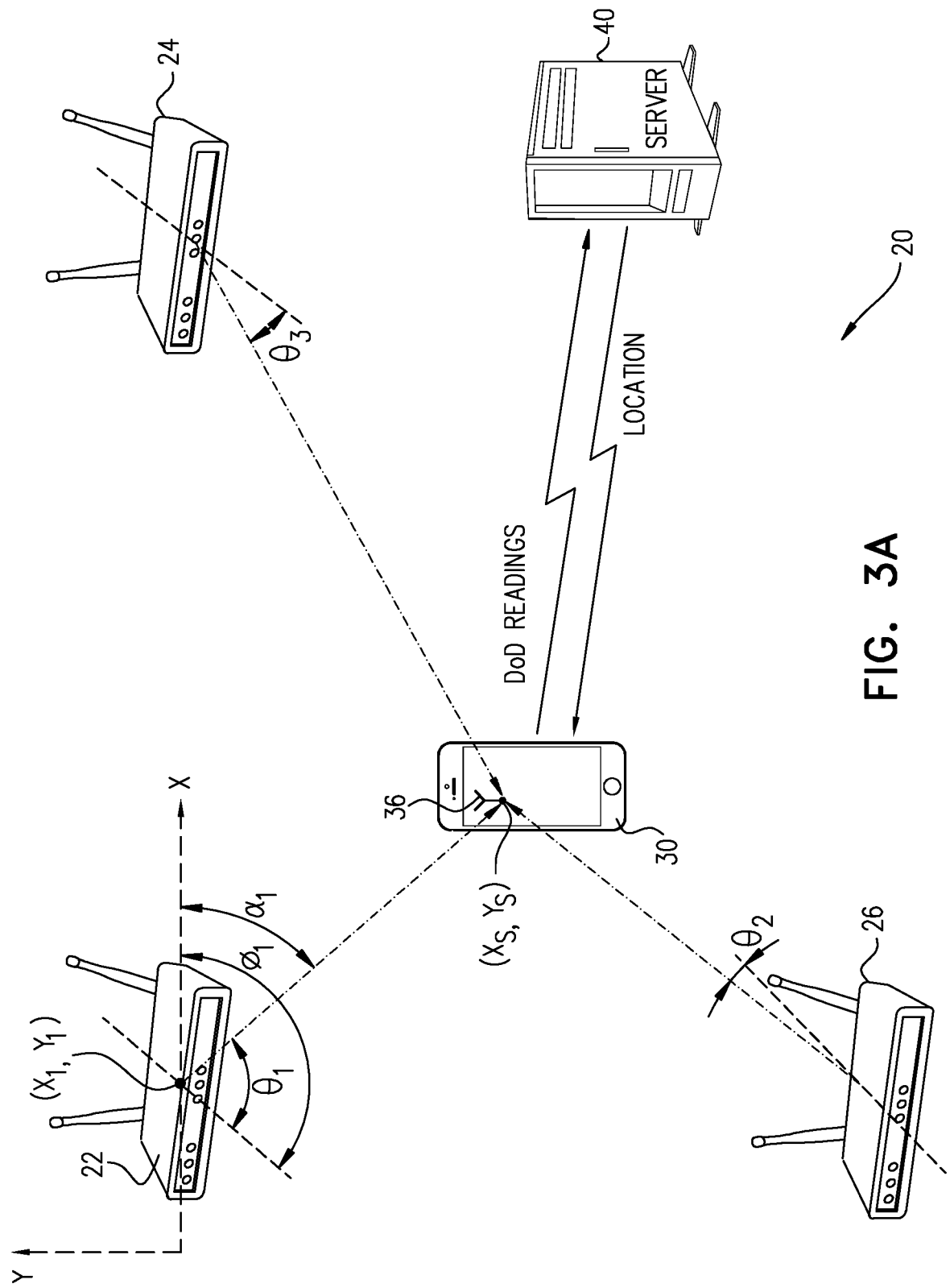
FIG. 3A is a schematic, pictorial illustration of components of the system of FIG. 1, illustrating a method for finding the location of a mobile communication device, in accordance with an embodiment of the invention.

FIG. 3A is a schematic, pictorial illustration of components of the system of FIG. 1, illustrating a method for finding the position of mobile station 30, in accordance with an embodiment of the invention. This method assumes that the respective location coordinates (labeled $x_i,y_i$) and BSSIDs of access points 22, 24 and 26 have already been mapped by server 40, in a frame of reference indicated by the (X,Y) axes in the figure. The map also indicates a respective orientation angle ($\phi_i$) for each access point, in this case the direction of a normal to the axis of the antenna array of each access point. The method of FIG. 3A uses angles of departure in a two-dimensional frame of reference (assuming the access points and mobile station to be in proximity to a common plane, as explained above). Alternatively, this method may use angles of arrival measured by the access points; and it may be extended to three dimensions, at the expense of some additional geometrical complication, as explained below.

In some embodiments, the map is constructed on the basis of measurements of angle of departure that were made previously by other mobile stations and/or other input data. The mobile stations in this case report their locations and the estimated angles of departure to server 40, along with respective identifiers of the access points, and the server constructs the map accordingly. Server 40 can build this access point map without requiring any cooperation by operators of the access points. Alternatively or additionally, the map may incorporate information provided by network operators and/or physical measurements made using dedicated equipment.

In the embodiment of FIG. 3A, mobile station 30 receives multi-antenna signals from each of access points 22, 24 and 26. The mobile station extracts the respective angle of departure for each access point, labeled $\theta_1$, $\theta_2$, and $\theta_3$ in the figure, using the techniques described above, along with the respective BSSIDs. Mobile station 30 reports these findings via network 38 (FIG. 1) to server 40, which returns corresponding location coordinates. The server may return the location coordinates and orientation angles of the access points $(x_i,y_i,\phi_i)$ in which case mobile station 30 can triangulate its own position $(x_s,y_s)$ based on these coordinates and the measured angles of departure. Alternatively or additionally, mobile station 30 conveys the values of the angles of departure that it has estimated to server 40, which then computes and returns the location coordinates to mobile station 30.

The location coordinates of mobile station 30 are computed by a process of CPD-based triangulation: Each CPD measurements defines two (or more) loci in a common plane to which access points 22, 24, 26, . . . , and mobile station 30 are in proximity. The loci have the form of rays extending through the plane from the respective location coordinates $(x_i,y_i)$ of the access points, in the fixed frame of reference of the map, at angles $\alpha_i$, defined by $\phi_i=\theta_i+\alpha_i$, as given by the respective orientation angle ($\theta_i$) and the measured angle of departure ($\theta_i$) from each of the plurality of the transmitters. The location coordinates $(x_s,y_s)$ of mobile station 30 correspond to an intersection of these rays, as shown in FIG. 3A. As in the case of FIG. 2, the ambiguity in the translation of CPD measurements to angle of departure is omitted from FIG. 3A for the sake of simplicity.

Figure 3B:
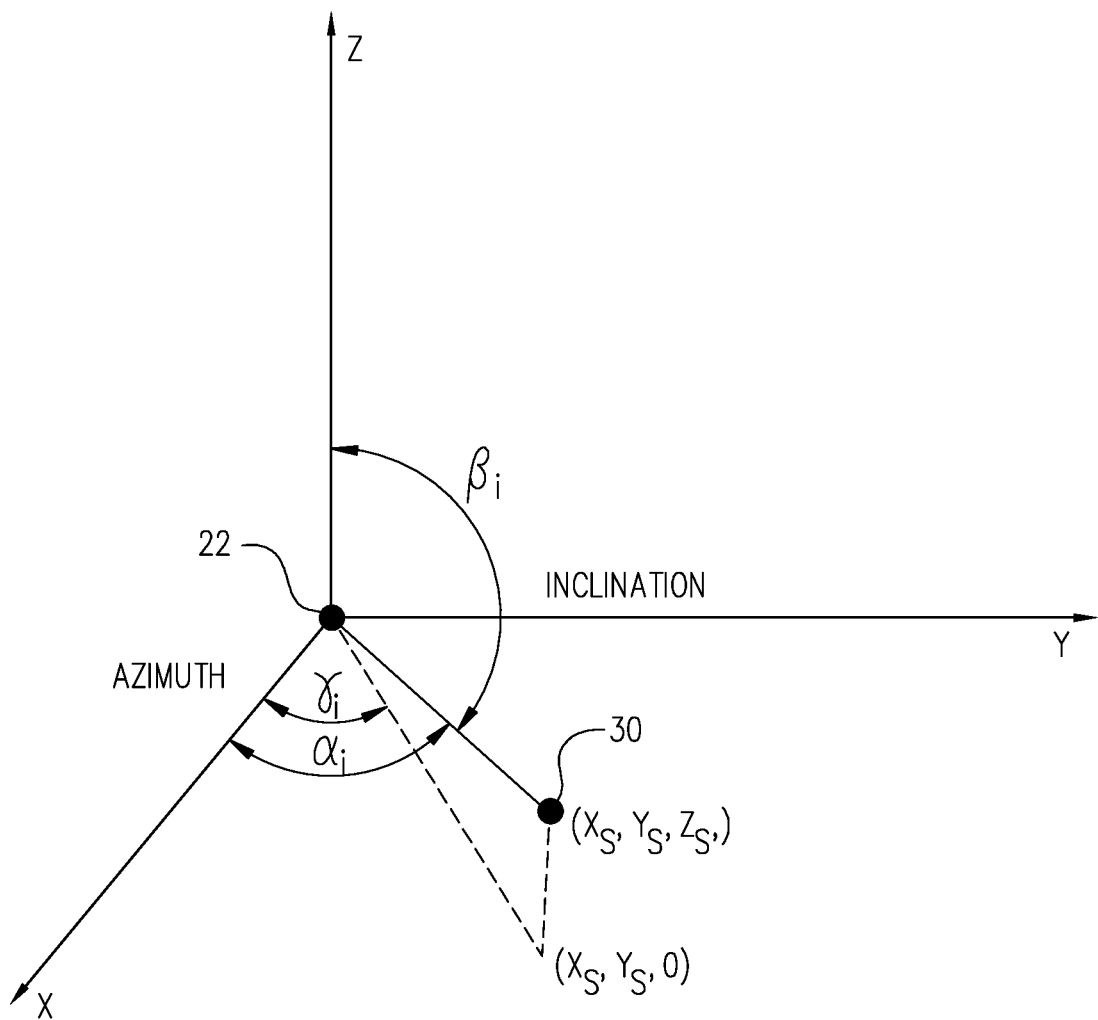
FIG. 3B is a diagram that schematically illustrates a method for finding the location of a mobile communication device, in accordance with an alternative embodiment of the invention.

FIG. 3B is a diagram that schematically illustrates a method for finding the location of mobile communication device 30, in accordance with an alternative embodiment of the invention. In this case, the angles $\alpha_i$, $\varphi_i$ and $\theta_i$ are extended to three dimensions. For example, in a spherical coordinate system, as shown in FIG. 3B, the angle $\alpha_i$ will have both an inclination component $\beta_i$ and an azimuth components $\gamma_i$, which are related by the formula $\cos(\alpha_i)=\sin(\beta_i)\cos(\gamma_i)$. In this case, the loci defined by the CPD values will have the form of curves, rather than linear rays, and the intersection of these curves gives the location of mobile station 30.

Figure 4:
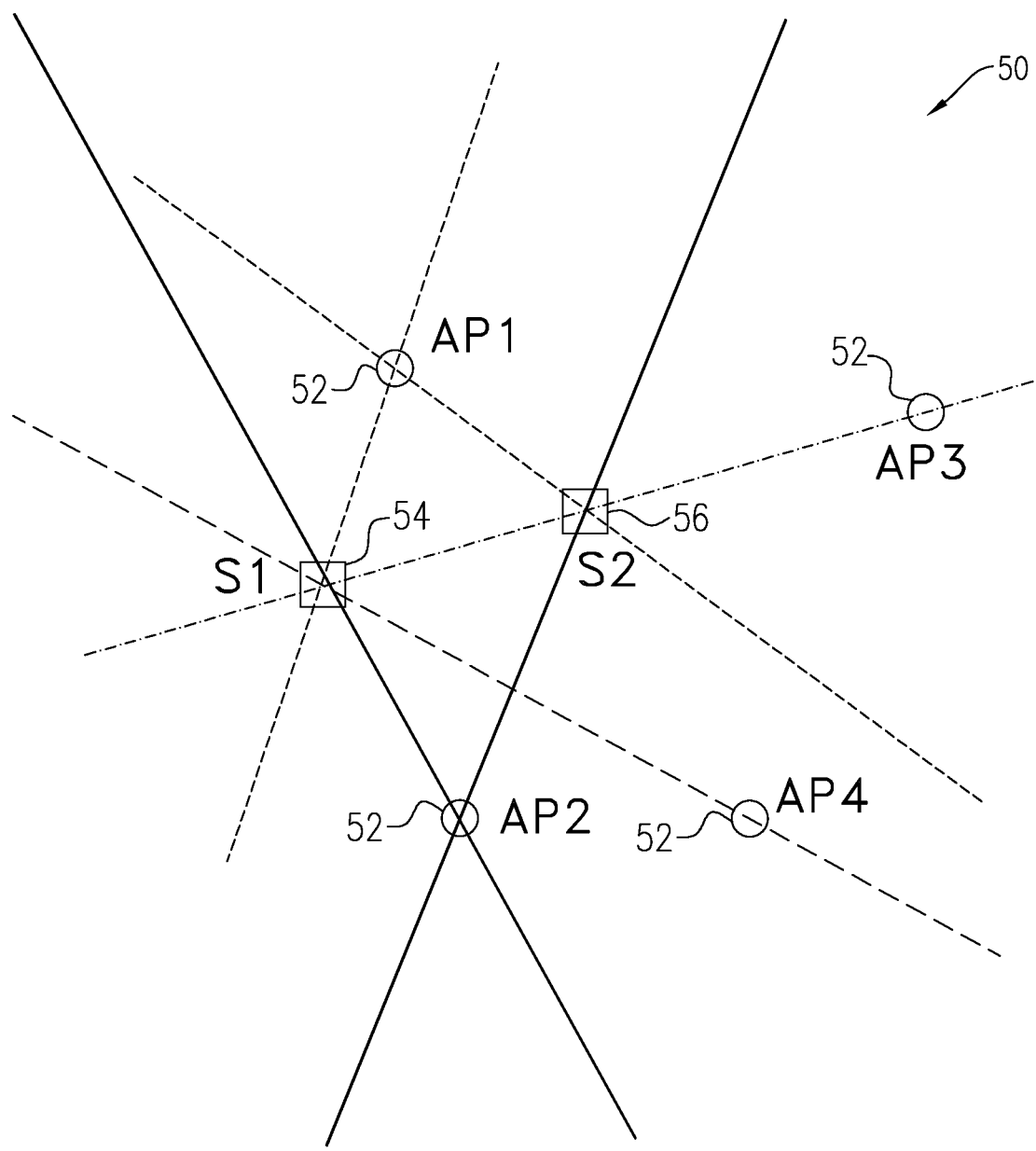
FIG. 4 is a diagram that schematically illustrates a process of location finding based on multiple transmitters, in accordance with an embodiment of the invention.
Figure 5:
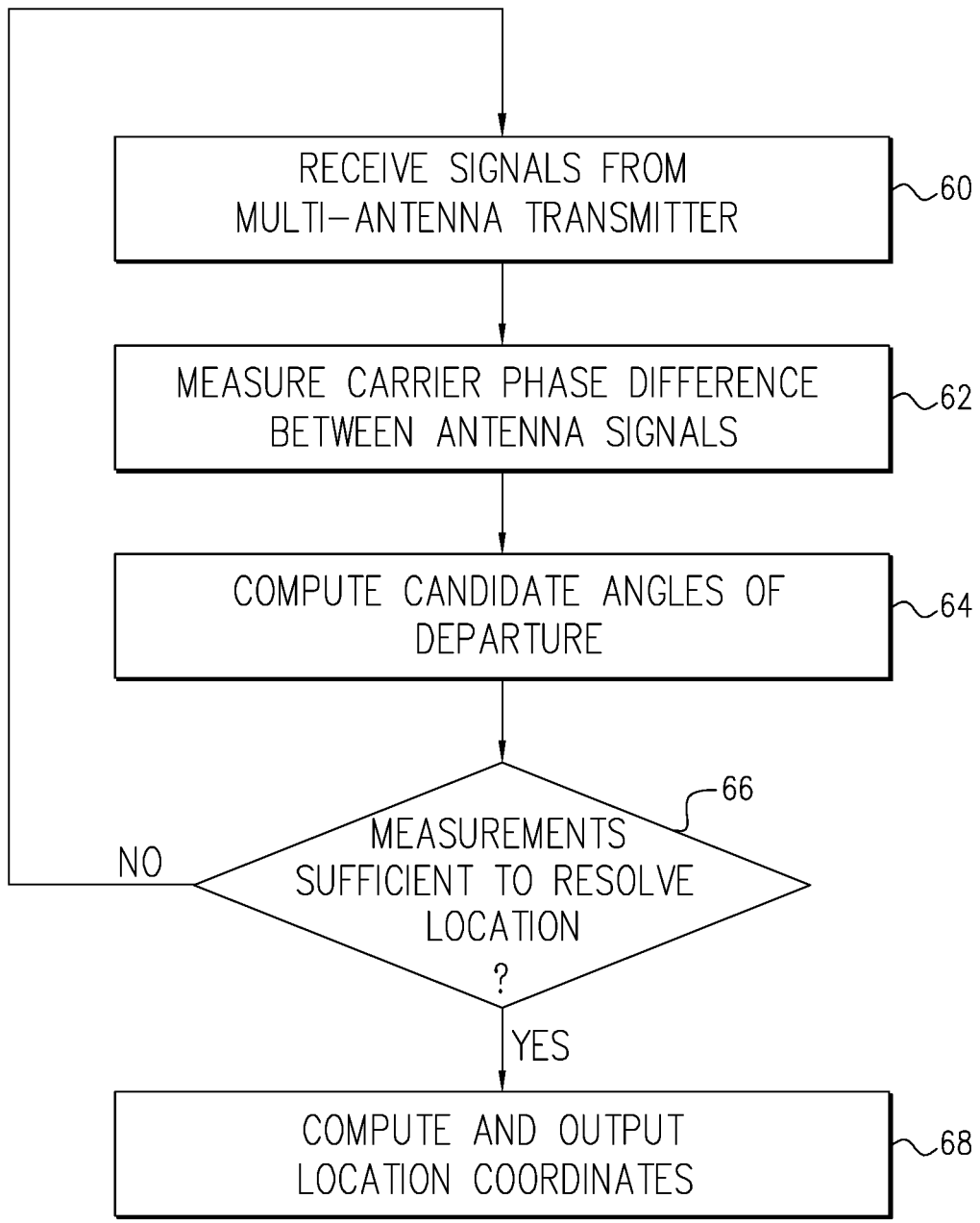
FIG. 5 is a flow chart that schematically illustrates a method for location finding, in accordance with an embodiment of the invention.

Reference is now made to FIGS. 4 and 5, which schematically illustrate a method for location finding based on multiple fixed transceivers, in accordance with an embodiment of the invention. FIG. 4 is a geometrical diagram of an area 50 showing the locations of fixed transceivers marked as transmitters 52 in the area (marked AP1, AP2, AP3, AP4), while FIG. 5 is a flow chart showing steps in the method. For simplicity of illustration, FIG. 4 assumes a two-dimensional model and shows the loci corresponding to the CPD values as linear rays, corresponding to angles of departure of signals from transmitters 52 to the receiver in a mobile transceiver. This method may alternatively be extended to three dimensions, and may similar be applied to values of angle of arrival, using the principles explained above.

The computing steps in this method may be carried out either by a central processor, such as processor 42 in server 40 (FIG. 1), or by a microprocessor embedded in the receiver, such as in mobile stations 28, 30, . . . , or in a distributed fashion among multiple processors. The term "processor," as used in the present description and in the claims, includes both local and distributed processors running under the control of software, as well as dedicated and programmable hardware-based processing logic.

A receiver, such as mobile station 30, receives signals from a multi-antenna transmitter, for example AP1, at a signal reception step 60. The receiver measured the CPD of the received signals in the manner described above, at a CPD measurement step 62. Based on the formula above, the receiver derives two or more possible angles of departure with respect to the transmitter, at an angle computation step 64. In the example shown in FIG. 4, AP1 is assumed to have an inter-antenna distance d that is larger than the wavelength of the radio signals transmitted by AP1, $$\frac{2d}{\lambda} > 1.$$

The CPD measured for AP1 therefore gives rise to four candidate angles of departure, which are represented by the four rays emanating from AP1 in the plane of the figure (two pairs of rays, with the two rays in each pair pointing in opposite directions, 180° apart).

In formal terms, each of the rays has a slope $\alpha_i'=\tan \alpha_i$ in the frame of reference of the map, wherein $\phi_i=\theta_i+\alpha_i$, as shown in FIG. 3A. Assuming AP1 to be located at known coordinates $(x_i,y_i)$ and the receiver to be at unknown coordinates $(x_s,y_s)$, each of the rays defines a corresponding linear equation: $y_i=\alpha_i'(x_i-x_s)+y_s$. Mobile station 30 or server 40 (depending on where the location-finding process is carried out) checks whether the measurements and corresponding equations that have been assembled thus far are sufficient to resolve the location of mobile station 30 unambiguously, at a measurement assessment step 66. If not, the process returns to step 60, and the measurements and computations are repeated over additional transmitters.

FIG. 4 shows the situation at step 66 after a number of successive iterations. After receiving signals and finding the candidate angles of departure from AP1, AP2 and AP3, there are still two possible locations 54 and 56 of mobile station 30, labeled S1 and S2. The processor will thus conclude at step 66 that further measurements are required and will seek to receive signals from yet another transmitter at step 60, in this case AP4. These signals indicate unambiguously that the mobile station is located at S1. The processor will then compute and output the location coordinates of the mobile station, at a location output step 68. Alternatively, mobile station 30 may collect and process signals from a larger number of transmitters, if available, which will result in an overdetermined set of equations, but can be used to increase the measurement accuracy.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for location finding, comprising:
   receiving radio signals transmitted between a plurality of fixed transceivers having multiple antennas at different, respective first locations and a mobile transceiver at a second location;
   detecting a respective phase difference between the received radio signals that are associated with each of the multiple antennas of each of the fixed transceivers;
   computing one or more respective angles between each of the fixed transceivers and the mobile transceiver based on the respective phase differences; and
   finding location coordinates of the mobile transceiver based on the angles and the transmit locations of the transmitters.

2. The method according to claim 1, wherein receiving the radio signals comprises receiving, by the mobile transceiver, the radio signals transmitted from the plurality of the fixed transceivers, and computing the one or more respective angles comprises computing angles of departure of the radio signals from the fixed transceivers to the mobile transceiver.

3. The method according to claim 1, wherein receiving the radio signals comprises receiving, by the fixed transceivers, the radio signals transmitted from the mobile transceiver, and computing the one or more respective angles comprises computing angles of arrival of the radio signals from the fixed transceivers to the mobile transceiver.

4. The method according to claim 1, wherein the fixed transceivers are disposed in proximity to a common plane, and wherein finding the location coordinates comprises computing the location coordinates of the mobile transceiver in the common plane.

5. The method according to claim 4, wherein the common plane is a floor in a man-made structure.

6. The method according to claim 1, wherein computing the one or more respective angles comprises defining multiple loci corresponding respectively to the angles between each of the plurality of the fixed transceivers and the mobile receiver, and wherein finding the location coordinates comprises identifying an intersection of the loci as the second location of the mobile transceiver.

7. The method according to claim 6, wherein the multiple loci comprise at least two rays extending from at least one of the first locations.

8. The method according to claim 7, wherein the multiple antennas of each of the fixed transceivers are separated by an inter-antenna distance, and wherein defining the multiple loci comprises computing an angular separation between the at least two rays as a function of a ratio between the inter-antenna distance and a wavelength of the radio signals.

9. The method according to claim 8, wherein defining the multiple loci comprises, when the ratio between the inter-antenna distance and a wavelength of the radio signals for a given fixed transceiver is greater than one, defining at least two of the rays emanating from the given fixed transceiver such that the angular separation between the at least two of the rays is less than 180°.

10. The method according to claim 1, wherein the radio signals transmitted over the air between a given fixed transceiver and the mobile transceiver comprise at least first and second radio signals, which are associated respectively with first and second ones of the multiple antennas and are both modulated with a given sequence of symbols, and
    wherein detecting the respective phase difference comprises identifying a given symbol in the sequence in each of the first and second radio signals that are received over the air, and measuring a delay in arrival of the given symbol between the first and second radio signals.

11. The method according to claim 10, wherein the first and second radio signals encode identical data using a multi-carrier encoding scheme with a predefined cyclic delay between the first and second radio signals, and wherein measuring the delay comprises applying the cyclic delay in detecting the respective phase difference.

12. The method according to claim 10, wherein the given sequence of the symbols comprises a predefined training sequence, and wherein identifying the given symbol comprises finding a specified one of the symbols in the training sequence.

13. The method according to claim 1, wherein detecting the respective phase difference comprises estimating channel state information between each of the multiple antennas and the mobile transceiver based on the received radio signals, and wherein computing the one or more respective angles comprises deriving the angles from the channel state information.

14. The method according to claim 1, wherein the fixed transceivers include at least one wireless access point, and wherein receiving the radio signals comprise receiving and processing the radio signals received by the mobile transceiver from the at least one wireless access point without establishing an association between the mobile transceiver and the at least one wireless access point.

15. The method according to claim 1, and comprising storing a map of the first locations of the fixed transceivers, and wherein finding the location coordinates comprises referring the computed angles to the map in order to find the location coordinates relative to the map.

16. The method according to claim 15, wherein the map is stored on a server, and wherein referring the computed angles of departure to the map comprises transmitting information to the server with respect to the received radio signals, and computing the location coordinates at the server using the transmitted information.

17. Apparatus for location finding, comprising:
    a mobile transceiver comprising at least one receive antenna, which is configured to receive at a given second location, radio signals transmitted from a plurality of fixed transceivers, each having multiple antennas, at different, respective first locations; and
    a processor, which is configured to process the received radio signals so as to detect a respective phase difference between the radio signals received from the multiple antennas of each of the fixed transceivers, to compute one or more respective angles of departure from each the fixed transceivers to the mobile transceiver based on the respective phase differences, and to find location coordinates of the mobile transceiver based on the angles of departure and the first locations of the fixed transceivers.

18. The apparatus according to claim 17, wherein the fixed transceivers are disposed in proximity to a common plane, and wherein the processor is configured to compute the location coordinates of the mobile transceiver in the common plane.

19. The apparatus according to claim 18, wherein the common plane is a floor in a man-made structure.

20. The apparatus according to claim 17, wherein the processor is configured to compute multiple loci corresponding respectively to the angles of departure from each of the plurality of the fixed transceivers, and to identify an intersection of the loci as the second location of the mobile transceiver.

21. The apparatus according to claim 20, wherein the multiple loci comprise at least two rays extending from at least one of the first locations.

22. The apparatus according to claim 21, wherein the multiple antennas of each of the fixed transceivers are separated by an inter-antenna distance, and wherein the processor is configured to compute an angular separation between the at least two rays as a function of a ratio between the inter-antenna distance and a wavelength of the radio signals.

23. The apparatus according to claim 22, wherein the processor is configured, when the ratio between the inter-antenna distance and a wavelength of the radio signals for a given fixed transceiver is greater than one, to define at least two of the rays emanating from the given fixed transceiver such that the angular separation between the at least two of the rays is less than 180°.

24. The apparatus according to claim 17, wherein the radio signals emitted from a given fixed transceiver comprise at least first and second radio signals, which are emitted respectively from first and second ones of the multiple antennas and are both modulated with a given sequence of symbols, and
    wherein the processor is configured to detect the respective phase difference by identifying a given symbol in the sequence in each of first and second radio signals received at the mobile transceiver, and measuring a delay in arrival at the mobile transceiver of the given symbol between the first and second radio signals.

25. The apparatus according to claim 24, wherein the first and second radio signals encode identical data using a multi-carrier encoding scheme with a predefined cyclic delay between the first and second radio signals, and wherein measuring the delay comprises applying the cyclic delay in detecting the respective phase difference.

26. The apparatus according to claim 24, wherein the given sequence of the symbols comprises a predefined training sequence, and wherein identifying the given symbol comprises finding a specified one of the symbols in the training sequence.

27. The apparatus according to claim 17, wherein the processor is configured to estimate channel state information between each of the multiple antennas and the mobile transceiver based on the received radio signals, and to derive the one or more respective angles from the channel state information.

28. The apparatus according to claim 17, wherein the fixed transceivers include at least one wireless access point, and wherein the mobile transceiver is configured to receive and process the radio signals from the at least one wireless access point without establishing an association between the mobile transceiver and the at least one wireless access point.

29. The apparatus according to claim 17, wherein the processor is configured to store a map of the first locations of the fixed transceivers, and to refer the computed angles of departure to the map in order to find the location coordinates relative to the map.

30. The apparatus according to claim 29, wherein the map is stored on a server, and wherein the mobile transceiver is configured to transmit information to the server with respect to the received radio signals, and the processor is configured to compute the location coordinates at the server using the transmitted information.

31. A system for location finding, comprising:
   a plurality of fixed transceivers, each having multiple antennas, at different, respective first locations, wherein the fixed transceivers are configured to receive via the multiple antennas radio signals transmitted from a mobile transmitter at a given second location; and
   a processor, which is configured to process the received radio signals so as to detect a respective phase difference between the radio signals received by the multiple antennas of each of the fixed transceivers, to compute one or more respective angles of arrival from the mobile transceiver to each of the fixed transceivers based on the respective phase differences, and to find location coordinates of the mobile transceiver based on the angles of arrival and the first locations of the fixed transceivers.

* * * * *